Dec. 13, 1927.
M. E. LAYNE
1,652,368
COUPLING FOR SUSPENDED SHAFT CASINGS
Filed June 9, 1924
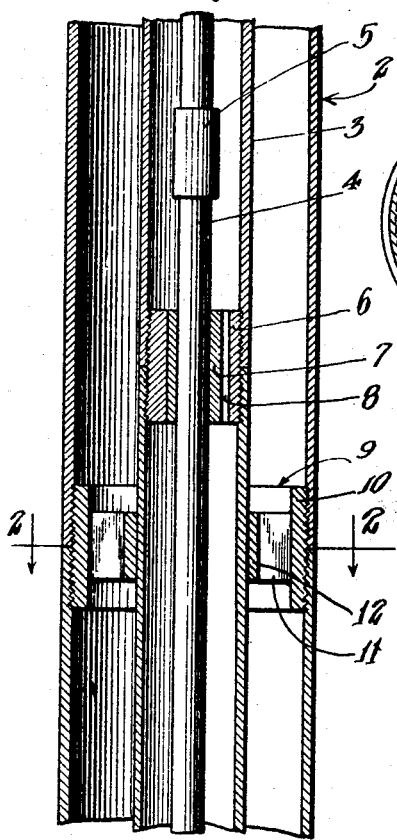
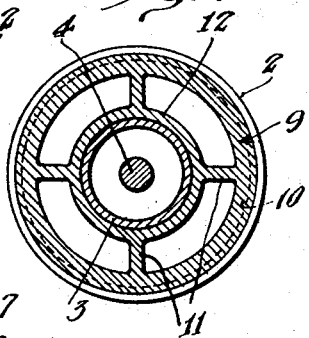
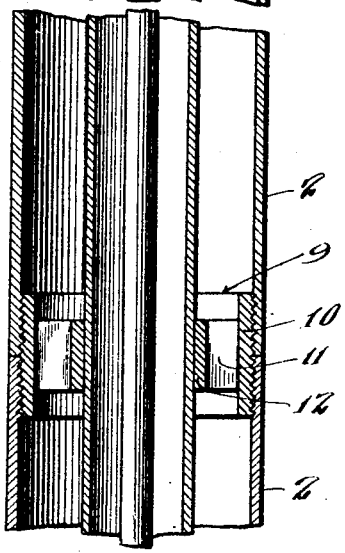
Inventor
Mahlon E. Layne
By Lyon & Lyon
Attorneys Patented Dec. 13, 1927.                                          1,652,368

UNITED STATES PATENT OFFICE.

MAHLON E. LAYNE, OF HOUSTON, TEXAS, ASSIGNOR TO LAYNE & BOWLER CORPORATION, OF LOS ANGELES, CALIFORNIA, A CORPORATION OF CALIFORNIA.

COUPLING FOR SUSPENDED SHAFT CASINGS.

Application filed June 9, 1924. Serial No. 718,803.

This invention relates to couplings for suspended shaft casings and refers particularly to couplings for such suspended shaft casings which are also designed to engage the inner casing or shaft at desired intervals to impart the rigidity of the outer casing to the inner casing or shaft.

The couplings of the class described which the art has hitherto employed for imparting the rigidity of an outer shaft casing or discharge pipe to an inner shaft casing or shaft have been unsatisfactory in that the prior couplings have been threaded to the exterior of the discharge pipe, with the result that a part of the coupling projects beyond the discharge casing. The result of such projection of the coupling beyond the discharge casing is that the coupling decreased the size of the discharge casing which could be lowered within a given size well and greatly increased the difficulty of raising and lowering such discharge casing, due to the contact between such protruding couplings and the clamps employed for supporting the same.

Moreover, when a string of casing is suspended down a well hole, the weight of the casing, having the separate sections of the casing connected together by such outside threaded couplings, has a tendency to draw the pipe in and away from the coupling, with the danger that the sections of the casing will break away from the coupling.

An object of the present invention is to provide a coupling for imparting the rigidity of a shaft casing to an inner casing or shaft, which coupling will not project beyond the normal outer wall of the shaft casing and therefore will provide a connected casing which can be readily handled without interference of the coupling with the action of the clamps employed to handle the casing, and which casing can be made in larger sizes than with the prior outside coupling type of shaft casing; and also to provide such a connected shaft casing that the separate sections of the casing will tend to draw in onto the coupling device and tighten the casings upon the coupler when suspended in the well hole.

Another object of the present invention is to provide such a coupling for a shaft casing that the sections of the casing may be screwed upon the coupling, one against the other, so as to leave a smooth exterior surface of the shaft casing. By such coupling, I have further provided a connecting shaft casing, the length of which may be accurately determined by the number of sections of casing employed therein, as all the sections are tight upon or against each other.

Another object of the present invention is to provide a coupling for imparting the rigidity of an outside discharge pipe to an inside casing or shaft, which may be more readily and economically manufactured than the couplings heretofore employed for the same purpose.

Other objects and advantages of the invention will be apparent from a description of a preferred example or embodiment of the invention, for which purpose reference is made to the accompanying drawings, in which the invention is illustrated in its preferred embodiment or embodiments.

In the drawings:

Figure 1 is an elevation in vertical section of the coupling embodying the invention, the coupling being employed for imparting the rigidity of an outer casing to an inner casing.

Fig. 2 is a transverse section on the line 2—2 of Figure 1.

Referring to the drawings, the type of line shaft casing therein illustrated is that which is commonly employed with the type of deep well rotary pumps illustrated in the Mahlon E. Layne patent on well mechanism, reissued September 24, 1912, No. 13,467, and in operation is employed for suspending a rotary pump in a well pit, as well as to provide a discharge casing and a driving shaft for such pump. The discharge casing is generally indicated by the outer casing sections 2, which are concentric with sections 3 of an inner shaft enclosing casing.

Within the shaft enclosing casing 3 are positioned sections 4 of a driving shaft held together by couplings such as 5. The sections of the shaft enclosing casing 3 are internally threaded to a bearing block 6 which provides a bearing for the driven shaft 4, preferably supporting a bushing 7 of bearing metal in engagement with the shaft 4 and having one or more vertically extending lubricant ducts 8 for passing lubricant down or up the shaft enclosing casing 3.

Such shaft enclosing casing 3, being smaller in size than the outer or discharge casing 2, is inherently less rigid and being subjected to the ripping tendency of the rotating shaft 4, should be supported by such outer shaft casing or discharge casing 2. For this purpose, the means employed to connect the sections 4 of the casing together ordinarily are provided with extensions engaging such inner shaft enclosing casing 3 to steady the shaft. In the art such couplings are commonly referred to as "spiders."

Such a coupling or spider is indicated at 9 and includes an outer shell 10 externally threaded so as to be engaged by the internal threads on the ends of the sections 2 of the outer casing in connecting the adjacent sections of such casing together, the threads extending the entire length of such shell 10 so that adjacent sections of casing may be screwed one against the other on the spider 9. In this manner the exterior surface of the casing 2 on the line shaft is smooth and can thus readily pass through any elevator or clamp used to lower or raise such line shaft, and moreover can closely fit the walls of the well pit, with the result that the casing 2 may be made larger than the customary form of couplings or spiders for such casing.

The spider 9 is provided with a number of webs 11 extending radially inward from the shell 10 to support an upright cylindrical bushing 12 engaging the outside of a section 3 of the shaft enclosing casing so that such spider may impart the rigidity of the outside casing 4 to hold the sections 3 in place in the line shafting. The webs 11, of course, do not substantially prevent the passage of fluid in the space between the outer and inner casings.

It will be observed that when tension is placed upon the different sections of the discharge casing 2, tending to pull such casing apart, the sections 2 will be drawn in and against the cylindrical shell 10 of the spider 9 to firmly grip said spider, in place of being drawn in and away from the spider, as with the general type of such spiders. Moreover, in manufacturing the spider 9, the entire threading of the spider may be readily conducted on one chucking.

While the embodiments of the invention herein described are well suited for the purposes of this invention, various modifications may be made in the details of construction, and the invention is not therefore limited to the details of construction of the devices shown, but is of the scope set forth in the appended claims.

I claim:—

1. A line shafting for suspending and operating a rotary pump in a well, comprising the combination of a driving shaft, a sectional shaft-enclosing casing concentric with said driving shaft, bearing blocks connecting sections of said casing and engaging the driving shaft, a sectional discharge casing concentric with said shaft and shaft-enclosing casing, and a spider connecting the sections of said discharge casing and threaded to the inner sides of said sections and having webs extending inwardly connected to a sleeve around said shaft-enclosing casing.

2. A line shafting for suspending and operating a rotary pump in a well, comprising a driving shaft, a sectional shaft-enclosing casing, bearing blocks for said shaft between said shaft and casing, and a spider having an outer shell spaced from an inner concentric shell with webs interconnecting said shells, the outer shell being exteriorly threaded and connecting adjacent sections of the sectional discharge casing, the inner shell engaging and enclosing the shaft-enclosing casing.

Signed at Los Angeles, Calif., this 29 day of May, 1924.

MAHLON E. LAYNE.